United States Patent [19]

Ripley et al.

[11] Patent Number: 4,723,445
[45] Date of Patent: Feb. 9, 1988

[54] VEHICLE WHEEL AND TIRE PRESSURE MONITOR

[75] Inventors: David R. Ripley, Flower Mound, Tex.; G. Thomas Watkins, IV; Gary B. Morgan, both of Spokane, Wash.

[73] Assignee: Neotech Industries, Inc., Flower Mound, Tex.

[21] Appl. No.: 864,800

[22] Filed: May 19, 1986

[51] Int. Cl.[4] ............................................. B60C 23/04
[52] U.S. Cl. ................................... 73/146.3; 73/146.5; 340/38; 374/143
[58] Field of Search ................ 73/146.2, 146.3, 146.5, 73/146.8, 714; 340/58; 374/143

[56] References Cited

U.S. PATENT DOCUMENTS

| | | | |
|---|---|---|---|
| 1,755,010 | 4/1930 | Little | 73/146.2 |
| 2,279,140 | 4/1942 | Kellen | 73/723 |
| 2,329,039 | 9/1943 | Fenwick | 73/146.8 |
| 2,800,795 | 7/1957 | Trinca | 73/146.3 |
| 2,938,379 | 5/1960 | Reh | 73/146.8 |
| 3,266,304 | 8/1966 | Cohen et al. | 73/146.8 |
| 3,713,092 | 1/1973 | Ivenbaum | 340/58 |
| 3,717,030 | 2/1973 | McGhee et al. | 73/146.3 |
| 3,719,159 | 3/1973 | Davis | 73/146.3 |
| 3,787,806 | 1/1974 | Church | 340/58 |
| 3,857,283 | 12/1974 | Jennings et al. | 73/300 |
| 3,992,926 | 11/1976 | Berryhill | 128/652 |
| 4,038,532 | 7/1977 | Burris et al. | 364/557 |
| 4,059,823 | 11/1977 | Martin et al. | 340/58 |
| 4,074,227 | 2/1978 | Kalmus | 340/58 |
| 4,130,817 | 12/1978 | Hill et al. | 340/58 |
| 4,137,520 | 1/1979 | Deveau | 340/58 |
| 4,143,545 | 3/1979 | Sitabkhan | 73/146.8 |
| 4,160,234 | 7/1979 | Karbo et al. | 340/58 |
| 4,210,898 | 7/1980 | Betts | 340/58 |
| 4,237,728 | 12/1980 | Betts et al. | 73/146.5 |
| 4,250,759 | 2/1981 | Vago et al. | 73/723 |
| 4,263,579 | 4/1981 | Corgan et al. | 340/58 |
| 4,275,377 | 5/1981 | Matsuda et al. | 340/58 |
| 4,352,168 | 9/1982 | Anderson | 368/10 |
| 4,468,650 | 8/1984 | Barbee | 346/58 |
| 4,494,106 | 1/1985 | Smith et al. | 340/58 |
| 4,562,874 | 1/1986 | Scheller | 152/427 |
| 4,619,137 | 10/1986 | Bott | 73/146.5 |

FOREIGN PATENT DOCUMENTS 0036113  3/1980  Japan ................ 73/146.5

*Primary Examiner*—Donald O. Woodiel
*Attorney, Agent, or Firm*—Wells, St. John & Roberts

[57] ABSTRACT

A tire pressure monitor arranged on a conventional wheel with a visual display viewable from the exterior of the wheel when it is stationary. The display typically presents a numerical indication of tire pressure. The electronic components for the display are housed within an enclosure mounted to the disk of the wheel. An air duct leads through the rim of the wheel to the enclosure for sampling interior tire pressure.

18 Claims, 5 Drawing Figures

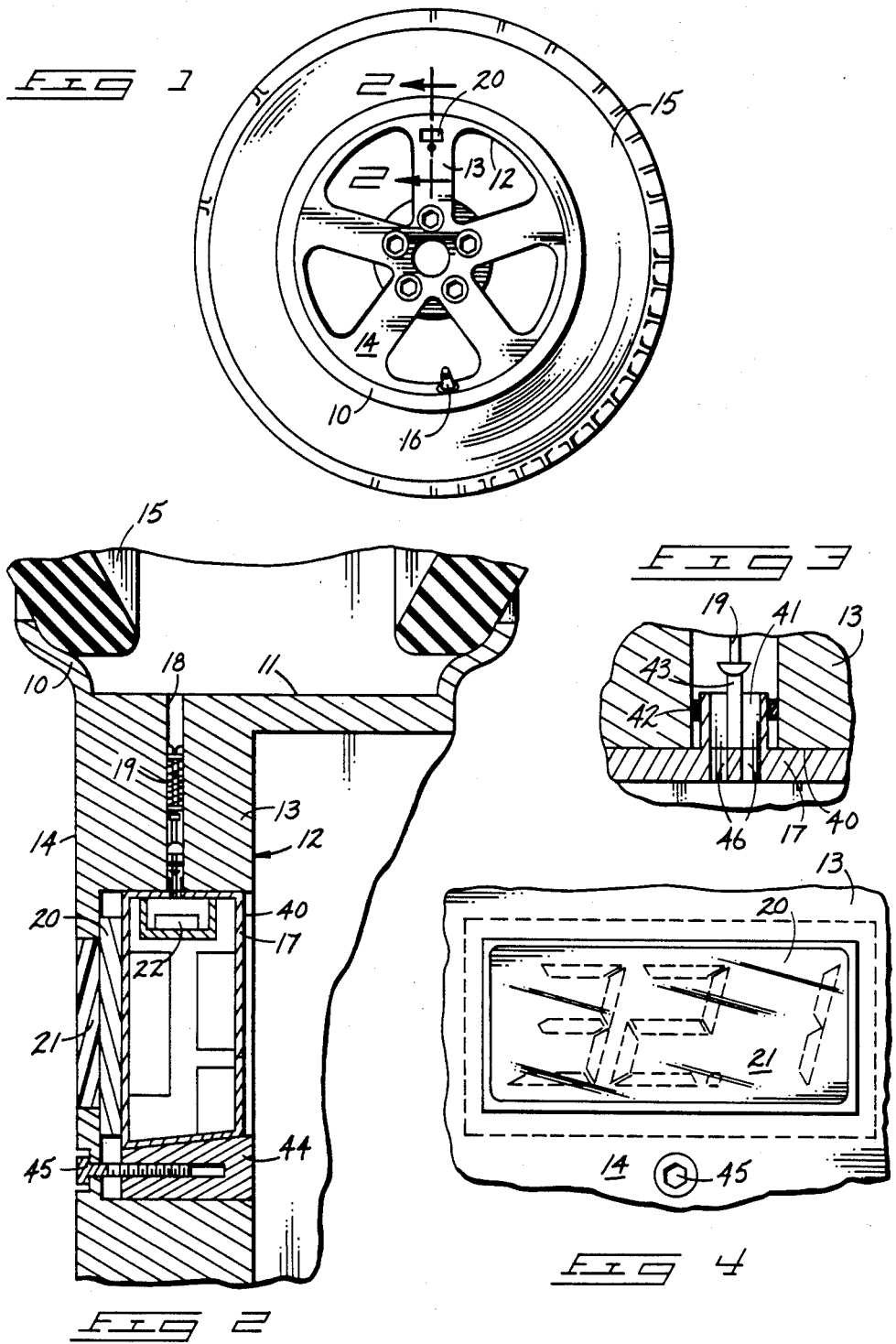

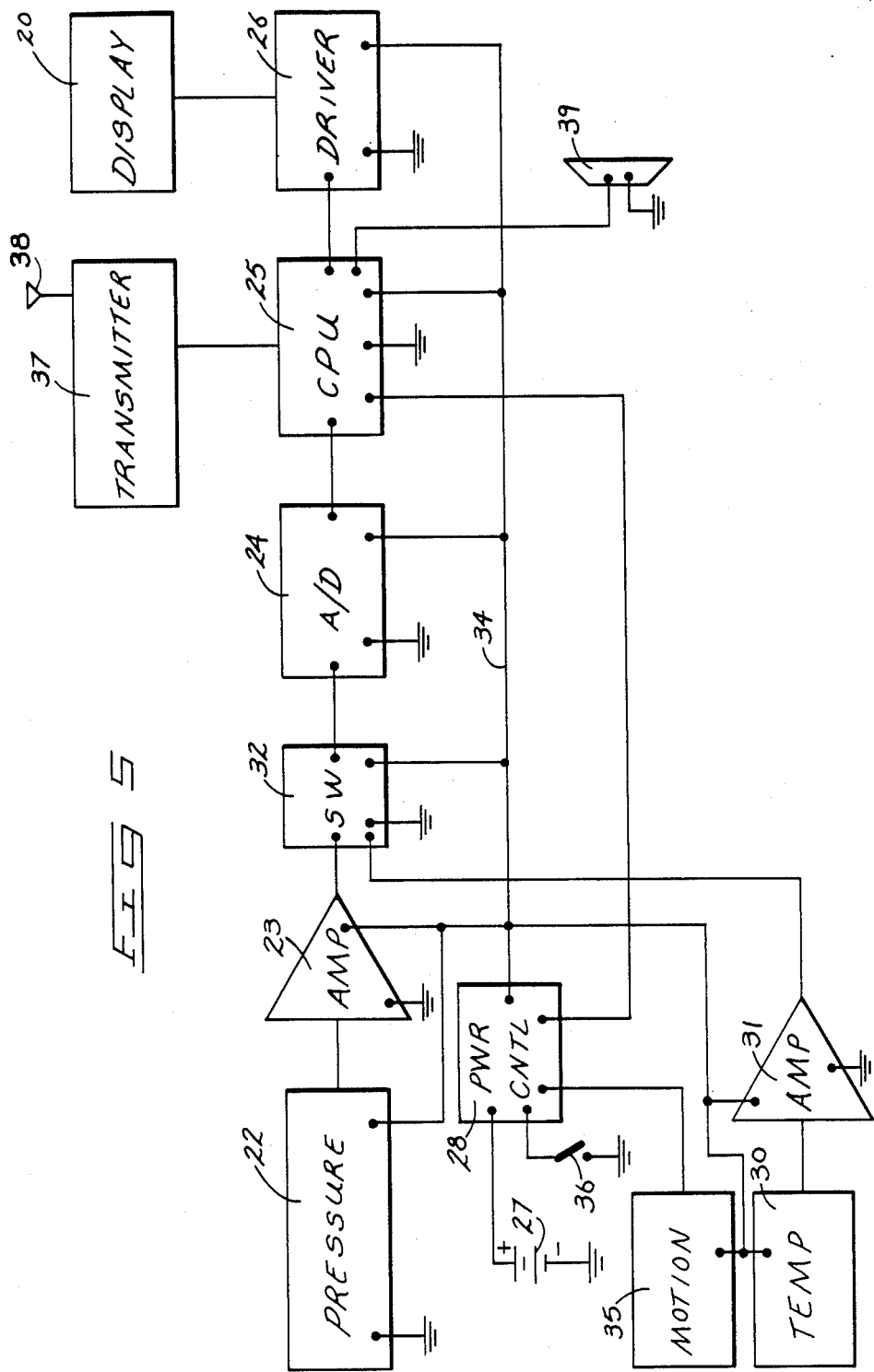

VEHICLE WHEEL AND TIRE PRESSURE MONITOR

FIELD OF THE INVENTION

This disclosure relates to electronic devices for providing a visual indication of tire pressure at the exterior of a vehicle wheel.

BACKGROUND OF THE INVENTION

With increasing emphasis being placed upon operational efficiency of motor vehicles and the desire of vehicle operators to prolong tire life, it has been increasingly recognized that users of motor vehicles should regularly monitor tire pressure. Frequent monitoring of tire pressure and maintanence of optimum pressure within each tire of a motor vehicle significantly improves vehicle fuel efficiency, increases operational vehicle safety, and prolongs tire life.

In most instances, tire pressure has been measured by application of an exterior gauge or other device to the conventional valve stem through which air is supplied to the tire interior. Mechanical gauges for this purpose are produced with substantial variations in quality, and are subject to mechanical deterioration and damage during their normal life. Hand held gauges are typically of a relatively small size, and are easily lost or misplaced, making them often unavailable when required by the user.

Wheel attachments for sensing tire pressure have been proposed in the past, but have been technically difficult to implement because of the rotational nature of the wheel on which the tire is mounted. Such monitors are typically restricted to usage as limit sensors and indicators which relay signals to the vehicle user indicating whether tire pressure is above or below a preset value.

The present invention arose from a desire to provide accurate visual monitoring of tire pressure without use of any external device apart from the wheel itself. The wheel includes an integral pressure sensor and associated electronic circuitry capable of displaying visual tire pressure information at an exterior wheel surface. In a preferred embodiment, this information is presented in the form of a numerical readout respresenting instantaneous tire pressure.

BRIEF DESCRIPTION OF THE DRAWINGS

The invention is illustrated in the accompanying drawings, in which:

FIG. 1 is a side elevation view of a typical tire and wheel incorporating the invention;

FIG. 2 is an enlarged fragmentary sectional view taken through the wheel along line 2—2 in FIG. 1;

FIG. 3 is an enlarged fragmentary sectional view through the duct and enclosure;

FIG. 4 is an enlarged fragmentary side elevation view showing the numeral display of tire pressure on the wheel; and FIG. 5 is a block diagram of the electronic components incorporated within the wheel.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The drawings illustrate a preferred form of this invention, which provides a visual indication of tire pressure at the exterior of a wheel on which the tire is mounted. As used herein, the term "wheel" shall be interpreted broadly to include any cylindrical structure mounting an inflated tire for use on a vehicle. FIGS. 1 and 2 specifically illustrate a stylized wheel that includes an annular rim 10 having a circumferential outer surface 11 adapted to support an inflated tire 15. Referring to FIG. 2, the conventional beads along the sidewalls of the tire 15 are engaged by the circumferential outer surface 11 of rim 10 in the conventional manner. Tire 15 is a tubeless tire, with the interior of the tire being exposed to the noncontacted portions of the rim outer surface 11. Tire 15 is provided with the conventional valve stem 16 through which air is directed to the tire interior for inflation purposes.

The wheel is completed by a disk 12 that is joined to and supports rim 10. Disk 12 is adapted to be mounted for rotation about a wheel axis centered within a circular opening coaxial with the disk 12 and rim 10. Disk 12 includes an outwardly facing surface 14 extending radially from the wheel axis to the rim 10.

As shown in FIG. 1, disk 12 includes a plurality of radial spokes 13, which are illustrative of the structure of many "stylized" wheels used today on automobiles and trucks. It is to be understood that the present invention is not limited to applications involving stylized wheels which are sometimes referred to as "mag" wheels, or even to wheels having a disk that includes spoke configurations. In fact, as used in this disclosure, the term "disk" shall include any form of disk supporting or attached to the surrounding wheel rim, whether or not the disk includes spokes, apertures, or other outer surface treatments. The term shall further include hub caps and total or partial wheel covers releasably attached to the disk and/or rim. In general, the present invention contemplates the provision of an outwardly viewable visual display on the wheel, and it is of no particular significance whether the display is viewable on the outer surface of the disk, on the rim, on a wheel cover, on a hub cap, or on any other similar wheel structure.

The present disclosure basically incorporates an air pressure sensor 22 for monitoring air pressure within tire 15 while supported on rim 10, and a display 20 located on the outwardly facing surface 14 of disk 14. Display 20 is operably connected to the air pressure sensor 22 for selectively presenting a visual indication of the monitored air pressure.

As illustrated in FIG. 4, the display 20 is preferably a digital or numerical display indicative of tire pressure. It can comprise a suitable number of conventional seven segment liquid crystal display (LCD) elements, or light emitting diodes (LED), or any similar electronic information display, whether numerical or not. Display 20, which is recessed within one spoke 13 of disk 12, is covered by a protective transparent panel or cover 21 to minimize accumulation of dirt on the display surface itself. Cover 21 also physically protects display 20 from exterior damage while in use on a vehicle.

Display 20 is located on an enclosure 17 fitted within a complementary recess 40 formed in the disk 12. The exterior shape of enclosure 17 is immaterial to an understanding of the present invention, but is illustrated as being substantially rectangular, as shown by the dashed line outline of enclosure 17 in FIG. 4.

Located within enclosure 17 is the sensor 22, which is preferably a conventional pressure responsive transducer, such as a piezoresistive transducer having an electrical resistance that varies depending upon the air pressure to which it is subjected. Other conventional forms of electronic transducers capable of producing an analog signal in response to air pressure can be utilized in this application.

A duct 18 leads to the pressure transducer 22 within enclosure 17, as shown in FIGS. 2 and 3. Duct 18 is essentially an enclosed air passage in pneumatic communication with the interior of a tire 15 supported on rim 10. It is preferably formed through rim 10 and disk 12, but can comprise a separate tube or hose connection leading through rim 10 to the interior of enclosure 17. In the illustrated embodiment, duct 18 leads between the outer surface 11 of rim 10 and the recess 40 formed in disk 12. It is adapted to establish pneumatic communication between the interior of a tire supported on rim 10 and the recess 40 within which the enclosure 17 is fitted.

Enclosure 17 is apertured at 46 (FIG. 3) at a location aligned with the duct 18. Apertures 46 are therefore in pneumatic communication with the duct 18. They interconnect the interior of tire 15 and at least that portion of the interior of enclosure 17 within which the pressure transducer 22 is physically located. As shown, apertures 46 are surrounded by a projecting annular extension 41 fixed to one wall of enclosure 17 and supporting an O-ring or other suitable seal or gasket that forms an airtight seal between enclosure 17 and duct 18. The enclosure 17 also includes a fixed abutment 43 centered within the extension 41. Its purpose is to operate a conventional tire valve core 19 located within duct 18. The valve core 19 is a normally closed valve that is spring biased to prevent passage of air through duct 18. When enclosure 17 is fitted within recess 40, the engagement of the valve core 19 by abutment 43 opens this valve and establishes the required open communication through the rim 10 and disk 12 to permit sensor 22 to monitor interior tire pressure.

The enclosure 17 can be held in place on disk 12 by any suitable fastening structure. In the illustrated example, excess space is provided within recess 40 at its side opposite to its connection to duct 18. This excess space is filled by a wedge-shaped plate 44 held in place within disk 12 by a locking screw 45. A separable cover plate overlapping all or a portion of enclosure 17, or removable brackets holding enclosure 17 to the back surfaces of disk 12 are alternate devices for holding the enclosure 17 securely on the disk 12. The details of the structural interconnection between enclosure 17 and disk 12 are not vital to an understanding of this disclosure.

FIG. 5 schematically illustrates the essential electronic components of the tire pressure monitor. These include the pressure sensor 22, whose analog output is signal fed through an amplifier 23 operably connected to an analog-to-digtal converter circuit shown at 24. The resulting digital signals corresponding to air pressure are directed to suitable electronic control means, such as a microprocessor circuit (CPU) 25. The CPU 25 controls operation of a driver circuit 26 that in turn operates the visual display 20, which typically provides a numerical display of air pressure at the exterior of the wheel. Power for the various electronic circuits is provided from a battery 27 within enclosure 17 through a power control circuit 28 that is operated by CPU 25 and an interconnecting power bus 34. All of the described circuit components are conventional and located within the confines of the previously-described enclosure 17.

Where desired, a temperature sensor or transducer 30 can be included within enclosure 17 or within the interior of tire 15 or duct 18. The temperature sensor 30 monitors air temperature. Its output is directed through an amplifier 31 to the analog-to-digital converter 24 by means of a multiplexing switch 32 operated under control of CPU 25. CPU 25 is therefore operably connected between the pressure sensor 22, the temperature sensor 30, and the display 20 and can be programmed to cause the display 20 to present a visual indication of monitored air pressure as a function of monitored air temperature. The desired relationships between tire pressure and temperature are well known, and the utilization of these relationships in the present device will be readily understood by one skilled in this field.

The monitoring circuitry can also include an audible signal device 39 operably connected to CPU 25. CPU 25 might be programmed to operate device 39 continuously, intermittently, or for one or more preset time periods of the monitored tire pressure is above or below a preset range of values. It might also be programmed to operate device 39 when the monitored pressure reaches a preset optimum value for a particular tire, which would assist one in properly inflating the tire by eliminating the need to visually observe display 20 as air is supplied through valve stem 16.

Since the visual display 20 cannot be read other than while the wheel is stationary, it might be advisable in some instances to control operation of the air pressure monitor and display 20 as a function of wheel rotation. This can be achieved by use of an electronic motion sensor 35, typically an electro-mechanical accelerometer, which is capable of sensing rotational wheel movement about the wheel axis. The motion sensor 35 is interconnected to CPU 25 through power control circuit 28 and power bus 34. In this manner, the CPU is operably connected between the pressure sensor 22, the motion sensor 35, and the display 20 for disabling the display 20 during rotational wheel movement and for enabling the display 20 to cause it to present a visual indication of air pressure when such movement terminates. This operation can be readily achieved by proper programming of CPU 25. To conserve battery life, the electronic control provided through CPU 25 can be programmed to disable display 20 following a predetermined time after rotational wheel movement has terminated. This timed interval would permit the vehicle user to visually observe the air pressure within each tire after the vehicle has stopped. In other circumstances, the CPU 25 might alternatively be programmed to function as a timer to periodically enable display 20 for predetermined time periods after rotational wheel movement has terminated. For instance, display 20 might be enabled for 15 seconds every five minutes. This would permit the vehicle user to inspect air pressure of the tires at any time when the vehicle is at rest.

As a final accessory to facilitate air pressure inspection, the present device can include a manually actuated switch 36 accessible at the exterior of the wheel. Switch 36 can be a pressure actuated push switch, or a proximity switch or other non-movable switch actuated when touched by the finger of a user. The switch might be incorporated within the cover 21 that overlays display 20. In any case, switch 36 is operable connected to the pressure sensor 22 and display 20 for selectively enabling the display 20 when a visual check of monitored air pressure is desired. Manual operation of display 20 is again a function of the properly programmed CPU 25, and the program instructions needed for this operation will be readily apparent to those skilled in this field.

Because of the rotational nature of vehicle wheels, it is important to the reliability and integrity of the air monitor that it be self-contained and have no leads or connectors to exterior equipment. Where remote reading of air pressure or temperature is required, such as on the dash of the vehicle, digital information can be transmitted by a small radio transmitter 37 within the enclosure 17 and an antenna 38 included within it as well. Where interactive operation of the air pressure monitor is desired in conjunction with an onboard computer in the vehicle, a transceiver would be utilized in place of transmitter 37. CPU 25 can be programmed to periodically monitor air pressure and/or air temperature, or can be interactive in response to interrogation signals received through conventional transceiver operations.

The battery 27 can be any suitable storage battery capable of operation within the described environment within enclosures 17. It can either be replaced when discharged, or can be recharged during rotation of the wheel. This might be effected by inductance coupling to a stationary source of power on an adjacent vehicle element, or the battery 27 might be connected to a generator (not shown) located within tire 15 to generate electrical energy in response to the normal flexing of the sidewalls of tire 15 as it rolls along a supporting surface. Again, this is an accessory feature not vital to the basic air pressure monitor itself.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A vehicle wheel including an integral tire pressure monitor, comprising:
   an annular rim having a circumferential outer surface adapted to support an inflated tire;
   a disk supporting the rim and adapted to be mounted for rotation about a central wheel axis, the disk including an outwardly facing surface extending radially to the rim;
   air pressure sensing means mounted to the wheel for monitoring air pressure within a tire supported on the rim;
   display means located on the outwardly facing surface of the disk, the display means being operably connected to the air pressure sensing means for selectively presenting a visual indication of the monitored air pressure;
   the wheel having a stylized appearance wherein the disk includes a plurality of spokes;
   the display means being mounted within one spoke.

2. A vehicle wheel including an integral tire pressure monitor, comprising:
   an annular rim having a circumferential outer surface adapted to support an inflated tire;
   a disk supporting the rim and adapted to be mounted for rotation about a central wheel axis, the disk including an outwardly facing surface extending radially to the rim;
   air pressure sensing means mounted to the wheel for monitoring air pressure within a tire supported on the rim;
   display means located on the outwardly facing surface of the disk, the display means being operably connected to the air pressure sensing means for selectively presenting a visual indication of the monitored air pressure;
   temperature sensing means for monitoring air temperature within a tire supported on the rim;
   and electronic control means operably connected between the pressure sensing means, the temperature sensing means and the display means for causing the display means to present a visual indication of monitored air pressure as a function of monitored air temperature.

3. A vehicle wheel including an integral tire pressure monitor, comprising:
   an annular rim having a circumferential outer surface adapted to support an inflated tire;
   a disk supporting the rim and adapted to be mounted for rotation about a central wheel axis, the disk including an outwardly facing surface extending radially to the rim;
   air pressure sensing means mounted to the wheel for monitoring air pressure within a tire supported on the rim;
   display means located on the outwardly facing surface of the disk, the display means being operably connected to the air pressure sensing means for selectively presenting a visual indication of the monitored air pressure;
   motion sensing means for sensing rotational wheel movement about the wheel axis;
   and electronic control means operably connected between the pressure sensing means, the motion sensing means and the display means for disabling the display means during rotational wheel movement and for enabling the display means to cause it to prevent a visual indication of air pressure when such movement terminates.

4. The vehicle wheel of claim 3, wherein the electronic means includes timer means that also disables the display means following a predetermined time after rotational wheel movement has terminated.

5. The vehicle wheel of claim 3, wherein the electronic means includes timer means that periodically enables the display means for predetermined time periods after rotational wheel movement has terminated.

6. A vehicle wheel including an integral tire pressure monitor, comprising:
   an annular rim having a circumferential outer surface adapted to support an inflated tire;
   a disk supporting the rim and adapted to be mounted for rotation about a central wheel axis, the disk including an outwardly facing surface extending radially to the rim;
   air pressure sensing means mounted to the wheel for monitoring air pressure within a tire supported on the rim;
   display means located on the outwardly facing surface of the disk, the display means being operably connected to the air pressure sensing means for selectively presenting a visual indication of the monitored air pressure; and manually actuated switch means on the wheel, the manually actuated switch means being operably connected to the pressure sensing means and display means for selectively enabling the display means when a visual check of monitored air pressure is desired.

7. A tire pressure monitoring device for use on a vehicle wheel having an annular rim with a circumferential outer surface adapted to support an inflated tire and a radial disk supporting the rim and adapted to be mounted for rotation about a central wheel axis, wherein the disk includes an outwardly facing surface extending radially to the rim; the tire pressure monitoring device comprising:
  an enclosure adapted to be fixed to the disk of a wheel;
  air pressure sensing means located within the enclosure;
  air supply means on the enclosure adapted to be connected in pneumatic communication with the interior of a tire;
  display means on the exterior of the enclosure, the display means being operably connected to the air pressure sensing means for selectively presenting a visual indication of the monitored air pressure;
  temperature sensing means located within the enclosure in pneumatic communication with the air supply means for monitoring instantaneous air temperature within the air supply means; and
  electronic control means within the enclosure operably connected between the air pressure sensing means, the temperature sensing means and the display means for causing the display means to present a visual indication of the monitored air pressure as a function of the monitored air temperature.

8. A tire pressure monitoring device for use on a vehicle wheel having an annular rim with a circumferential outer surface adapted to support an inflated tire and a radial disk supporting the rim and adapted to be mounted for rotation about a central wheel axis, wherein the disk includes an outwardly facing surface extending radially to the rim; the tire pressure monitoring device comprising:
  an enclosure adapted to be fixed to the disk of a wheel;
  air pressure sensing means located within the enclosure;
  air supply means on the enclosure adapted to be connected in pneumatic communication with the interior of a tire;
  display means on the exterior of the enclosure, the display means being operably connected to the air pressure sensing means for selectively presenting a visual indication of the monitored air pressure;
  motion sensing means located within the enclosure adapted to sense rotational movement of the enclosure about a wheel axis; and
  electronic means operably connected between the air pressure sensing means, the motion sensing means and the display means for disabling the display means during rotational movement of the enclosure about a wheel axis and for enabling the display means to cause it to present a visual indication of air pressure when such movement terminates.

9. The tire pressure monitoring device of claim 8 wherein the electronic means includes a timer circuit that also disables the display means following a predetermined time after rotational wheel movement has terminated.

10. The tire pressure monitoring device of claim 8 wherein the electronic means includes a timer circuit that periodically enables the display means for predetermined time periods after rotational movement of the enclosure about a wheel axis has terminated.

11. A tire pressure monitoring device for use on a vehicle wheel having an annular rim with a circumferential outer surface adapted to support an inflated tire and a radial disk supporting the rim and adapted to be mounted for rotation about a central wheel axis, wherein the disk includes an outwardly facing surface extending radially to the rim; the tire pressure monitoring device comprising:
  an enclosure adapted to be fixed to the disk of a wheel;
  air pressure sensing means located within the enclosure;
  air supply means on the enclosure adapted to be connected in pneumatic communication with the interior of a tire;
  display means on the exterior of the enclosure, the display means being operably connected to the air pressure sensing means for selectively presenting a visual indication of the monitored air pressure; and
  manually actuated switch means at the exterior of the enclosure, the manually actuated switch means being operably connected to the pressure sensing means and display means for selectively enabling the display means when a visual check of monitored air pressure is desired.

12. A vehicle wheel including an integral tire pressure monitor, comprising:
  an annular rim having a circumferential outer surface adapted to support an inflated tire;
  a disk supporting the rim and adapted to be mounted for rotation about a central wheel axis, the disk including an outwardly facing surface extending radially to the rim;
  an enclosure adapted to be fitted within a complementary recess formed in the disk;
  duct means leading between the outer surface of the rim and the recess formed in the disk, the duct means being adapted to establish pneumatic communication between the interior of a tire supported on the rim and the recess;
  aperture means formed through the enclosure in pneumatic communication with the duct means;
  air pressure sensing means located within the enclosure;
  display means on the exterior of the enclosure, viewable on the outwardly facing surface of the disk, the display means being operably connected to the air pressure sensing means for selectively presenting a visual indication of the monitored air pressure;
  the vehicle wheel having a stylized appearance wherein the disk includes a plurality of spokes; and
  the recess being formed in one spoke with the display means being viewable on its outwardly facing surface.

13. A vehicle wheel including an integral tire pressure monitor, comprising:
  an annular rim having a circumferential outer surface adapted to support an inflated tire;
  a disk supporting the rim and adapted to be mounted for rotation about a central wheel axis, the disk including an outwardly facing surface extending radially to the rim;

an enclosure adapted to be fitted within a complementary recess formed in the disk;

duct means leading between the outer surface of the rim and the recess formed in the disk, the duct means being adapted to establish pneumatuc communication between the interior of a tire supported on the rim and the recess;

aperture means formed through the enclosure in pneumatic communication with the duct means;

air pressure sensing means located within the enclosure;

display means on the exterior of the enclosure, viewable on the outwardly facing surface of the disk, the display means being operably connected to the air pressure sensing means for selectively presenting a visual indication of the monitored air pressure;

normally closed valve means within the duct means for sealing the duct means to prevent passage of air through it when the enclosure is not in place within the recess; and means on the enclosure for opening said valve means when the enclosure is in place within the recess.

14. A vehicle wheel including an integral tire pressure monitor, comprising:

an annular rim having a circumferential outer surface adapted to support an inflated tire;

a disk supporting the rim and adapted to be mounted for rotation about a central wheel axis, the disk including an outwardly facing surface extending radially to the rim;

an enclosure adapted to be fitted within a complementary recess formed in the disk;

duct means leading between the outer surface of the rim and the recess formed in the disk, the duct means being adapted to establish pneumatic communication between the interior of a tire supported on the rim and the recess;

aperture means formed through the enclosure in pneumatic communication with the duct means;

air pressure sensing means located within the enclosure;

display means on the exterior of the enclosure, viewable on the outwardly facing surface of the disk, the display means being operably connected to the air pressure sensing means for selectively presenting a visual indication of the monitored air pressure;

temperature sensing means located within the enclosure in pneumatic communication with the duct means for monitoring instantaneous air temperature within the duct means; and electronic control means within the enclosure operably connected between the air pressure sensing means, the temperature sensing means and the display means for causing the display means to present a visual indication of the monitored air pressure as a function of the monitored air temperature.

15. A vehicle wheel including an integral tire pressure monitor, comprising:

an annular rim having a circumferential outer surface adapted to support an inflated tire;

a disk supporting the rim and adapted to be mounted for rotation about a central wheel axis, the disk including an outwardly facing surface extending radially to the rim;

an enclosure adapted to be fitted within a complementary recess formed in the disk;

duct means leading between the outer surface of the rim and the recess formed in the disk, the duct means being adapted to establish pneumatic communication between the interior of a tire supported on the rim and the recess;

aperture means formed through the enclosure in pneumatic communication with the duct means;

air pressure sensing means located within the enclosure;

display means on the exterior of the enclosure, viewable on the outwardly facing surface of the disk, the display means being operably connected to the air pressure sensing means for selectively presenting a visual indication of the monitored air pressure;

motion sensing means located within the enclosure adapted to sense rotational movement of the enclosure about a wheel axis; and electronic means operably connected between the air pressure sensing means, the motion sensing means and the display means for disabling the display means during rotational movement of the enclosure about a wheel axis and for enabling the display means to cause it to present a visual indication of air pressure when such movement terminates.

16. The vehicle wheel of claim 15 wherein the electronic means includes a timer circuit that also disables the display means following a predetermined time after rotational wheel movement has terminated.

17. The vehicle wheel of claim 15 wherein the electronic means includes a timer circuit that periodically enables the display means for predetermined time periods after rotational movement of the enclosure about a wheel axis has terminated.

18. A vehicle wheel including an integral tire pressure monitor, comprising:

an annular rim having a circumferential outer surface adapted to support an inflated tire;

a disk supporting the rim and adapted to be mounted for rotation about a central wheel axis, the disk including an outwardly facing surface extending radially to the rim;

an enclosure adapted to be fitted within a complementary recess formed in the disk;

duct means leading between the outer surface of the rim and the recess formed in the disk, the duct means being adapted to establish pneumatic communication between the interior of a tire supported on the rim and the recess;

aperture means formed through the enclosure in pneumatic communication with the duct means;

air pressure sensing means located within the enclosure;

display means on the exterior of the enclosure, viewable on the outwardly facing surface of the disk, the display means being operably connected to the air pressure sensing means for selectively presenting a visual indication of the monitored air pressure; and manually actuated switch means at the exterior of the enclosure, the manually actuated switch means being operably connected to the pressure sensing means and display means for selectively enabling the display means when a visual check of monitored air pressure is desired.

* * * * *